US012708845B2

(12) United States Patent
Li et al.

(10) Patent No.: US 12,708,845 B2
(45) Date of Patent: Aug. 18, 2026

(54) ENCIRCLEMENT FOR SELECTING OBJECTS DISPLAYED ON A TOUCHSCREEN

(71) Applicant: NetEase (Hangzhou) Network Co., Ltd., Hangzhou (CN)

(72) Inventors: Yucheng Li, Hangzhou (CN); Haiyan Liu, Hangzhou (CN)

(73) Assignee: NetEase (Hangzhou) Network Co., Ltd., Hangzhou (CN)

( * ) Notice: Subject to any disclaimer, the term of this patent is extended or adjusted under 35 U.S.C. 154(b) by 301 days.

(21) Appl. No.: 18/572,748

(22) PCT Filed: May 23, 2022

(86) PCT No.: PCT/CN2022/094393
§ 371 (c)(1),
(2) Date: Dec. 20, 2023

(87) PCT Pub. No.: WO2023/097993
PCT Pub. Date: Jun. 8, 2023

(65) Prior Publication Data

US 2024/0286032 A1 Aug. 29, 2024

(30) Foreign Application Priority Data

Dec. 2, 2021 (CN) .......................... 202111511432.5

(51) Int. Cl.
*A63F 9/24* (2006.01)
*A63F 13/40* (2014.01)
(Continued)

(52) U.S. Cl.
CPC ............ *A63F 13/40* (2014.09); *A63F 13/822* (2014.09); *G06F 3/04842* (2013.01); *G06F 3/0488* (2013.01)

(58) Field of Classification Search
CPC ...... A63F 13/2145; A63F 13/42; A63F 13/52; A63F 13/537; A63F 13/56; A63F 13/822;
(Continued)

(56) References Cited

U.S. PATENT DOCUMENTS

2006/0252540 A1* 11/2006 Kando .................... A63F 13/10
463/36
2011/0175821 A1 7/2011 King

FOREIGN PATENT DOCUMENTS

CN 111841000 A 10/2020
CN 112190922 A 1/2021
(Continued)

OTHER PUBLICATIONS

English Abstract of cited patent documents.
(Continued)

*Primary Examiner* — Lawrence S Galka
(74) *Attorney, Agent, or Firm* — Greenberg Traurig, LLP

(57) ABSTRACT

An information processing method, device, equipment, and storage medium are provided. A graphical user interface is provided by a first terminal, where the graphical user interface displays at least a part of a game scene and at least one first virtual object located in the game scene. The method includes: responding to a first touch operation on the graphical user interface and a sliding operation on the graphical user interface, and determining a sliding track of the sliding operation; and selecting a first virtual object associated with the sliding track of the sliding operation as a target virtual object.

18 Claims, 4 Drawing Sheets

(51) Int. Cl.
*A63F 13/822* (2014.01)
*G06F 3/04842* (2022.01)
*G06F 3/0488* (2022.01)

(58) Field of Classification Search
CPC .............. A63F 13/92; A63F 2300/1075; A63F 2300/204; A63F 2300/6045; A63F 2300/6623; A63F 2300/8029
See application file for complete search history.

(56) References Cited

FOREIGN PATENT DOCUMENTS

| | | | |
|---|---|---|---|
| CN | 113209624 | A | 8/2021 |
| CN | 113457144 | A | 10/2021 |
| CN | 114377383 | A | 4/2022 |
| JP | 2006304863 | A | 11/2006 |
| JP | 2015047308 | A | 3/2015 |
| JP | 2018158230 | A | 10/2018 |
| JP | 6928709 | B1 | 7/2022 |
| WO | 2020168680 | A1 | 8/2020 |

OTHER PUBLICATIONS

English translation of ISR of WO2023097993.
English translation of Written Opinion of the International Searching Authority of WO2023097993.
International Search Report of WO203097993.
Written Opinion of the International Searching Authority of WO2023097993.
Japanese Patent Office, Decision to Grant a Patent Application No. 2023-550083, Certification Date: Dec. 2, 2024 (Reiwa 6).

* cited by examiner

ENCIRCLEMENT FOR SELECTING OBJECTS DISPLAYED ON A TOUCHSCREEN

CROSS-REFERENCE TO RELATED APPLICATION

The present disclosure is the U.S. National Stage Application of PCT International Application No. PCT/CN2022/094393, filed on May 23, 2022, which is based upon and claims the priority to the Chinese patent application with the filing No. 202111511432.5 filed on Dec. 2, 2021, and entitled "Information Processing Method, Device, Equipment, and Storage Medium", the entire contents of both of which are incorporated herein by reference for all purposes.

TECHNICAL FIELD

The present disclosure relates to the technical field of games, in particular, to information processing method, device, equipment, and storage medium.

BACKGROUND

As an important type of strategy games, RTS (Real-Time Strategy) games are popular with many users. In an RTS game, a user usually needs to select a plurality of virtual objects for manipulation. For example, in a military-type RTS game, the user usually needs to select a plurality of troops and command these troops.

In some related RTS mobile games, a user usually can only perform a selection operation on a plurality of virtual objects by means of box selection or multiple clicks. Taking the box selection manner as an example, the existing box selection manner can only box-select several fixed graphic ranges supported by games, such as a circular or rectangular graphic range.

However, such method for selecting a group of virtual objects is not flexible enough, the operation efficiency is relatively low, and the users' operation experience may suffer as a result.

SUMMARY

The present disclosure provides an information processing method, an electronic equipment, and a non-transitory storage medium.

In some aspects, the present disclosure provides an information processing method, including: responding, by a terminal, to a first touch operation on a graphical user interface and a sliding operation on the graphical user interface, and determining a sliding track of the sliding operation, where the graphical user interface is provided by the terminal, and the graphical user interface displays at least a part of a game scene and at least one first virtual object located in the game scene; and selecting a first virtual object associated with the sliding track of the sliding operation as a target virtual object.

In some aspects, the present disclosure provides an electronic equipment, including: a processor, a storage medium, and a bus, where the storage medium stores machine-readable instructions executable by the processor, and when the electronic equipment is running, the processor is in communication with the storage medium via the bus, and the processor executes the machine-readable instructions so as to execute the steps an information processing method, including: responding to a first touch operation on a graphical user interface and a sliding operation on the graphical user interface, and determining a sliding track of the sliding operation, where the graphical user interface is provided by the electronic equipment, and the graphical user interface displays at least a part of a game scene and at least one first virtual object located in the game scene; and selecting a first virtual object associated with the sliding track of the sliding operation as a target virtual object.

In some aspects, the present disclosure provides a non-transitory storage medium, storing a computer program, where the computer program, when executed by a processor, executes the steps of an information processing method, including: responding to a first touch operation on a graphical user interface and a sliding operation on the graphical user interface, and determining a sliding track of the sliding operation, where the graphical user interface is provided by an electronic equipment, and the graphical user interface displays at least a part of a game scene and at least one first virtual object located in the game scene; and selecting a first virtual object associated with the sliding track of the sliding operation as a target virtual object.

BRIEF DESCRIPTION OF DRAWINGS

In order to more clearly illustrate the embodiments of the present disclosure, drawings which need to be used in the embodiments will be introduced below briefly. It should be understood that the drawings below merely show some embodiments of the present disclosure, and therefore should not be considered as limitation to the scope. Those ordinarily skilled in the art still could obtain other relevant drawings according to these drawings, without using any creative efforts.

DETAILED DESCRIPTION

Figures 1, 2, 3:
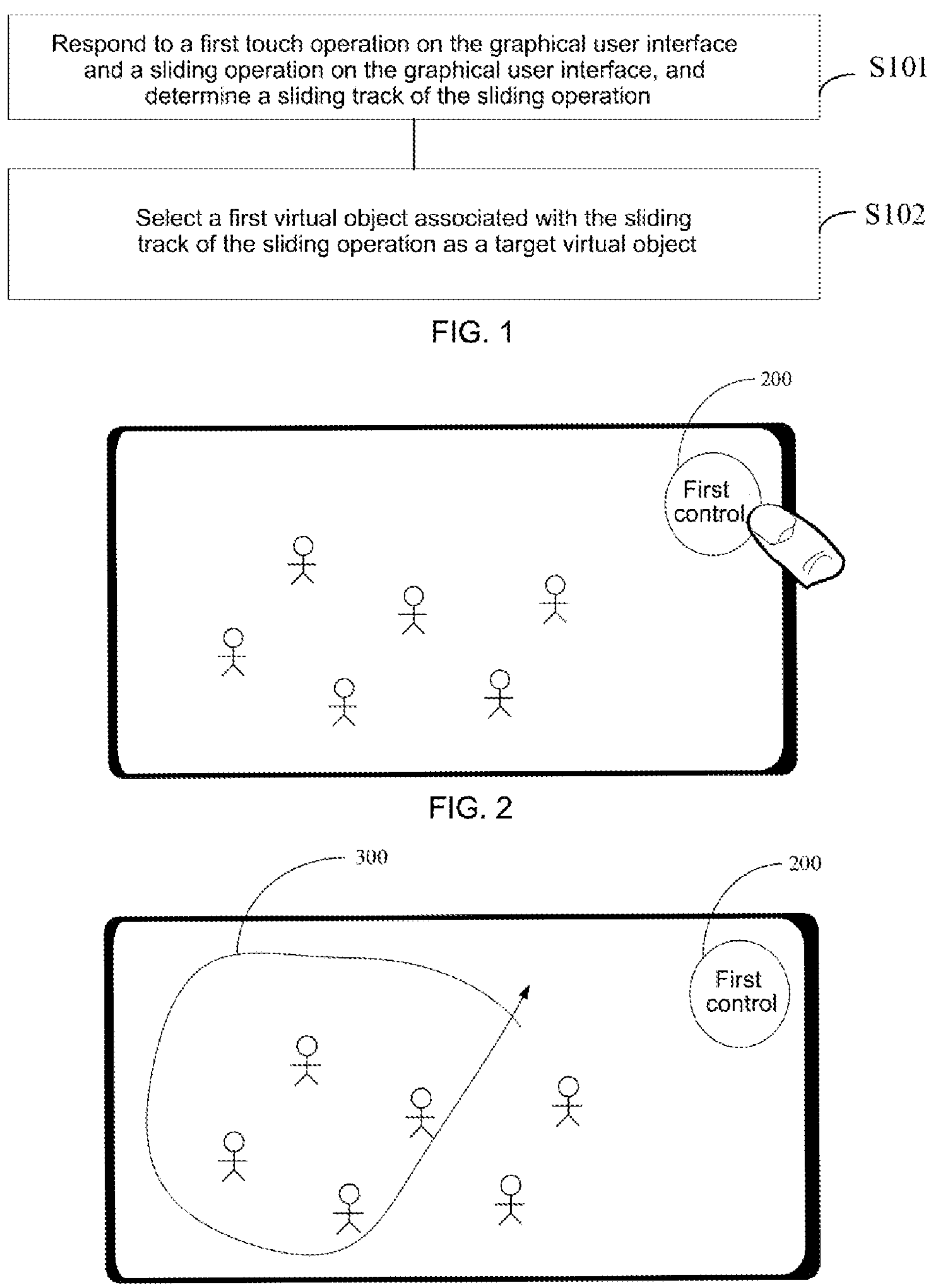
FIG. 1 is a schematic flowchart of an information processing method provided in an embodiment of the present disclosure.
FIG. 2 is a schematic diagram of a display interface of a first control provided in an embodiment of the present disclosure.
FIG. 3 is a schematic diagram of a display interface of a sliding track provided in an embodiment of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the present disclosure, unless otherwise specified and limited, in the description of the present disclosure, "a plurality of" means at least two, for example, two or three unless specifically limited otherwise. Terms "include", "comprise", or any other variants thereof are intended to cover a non-exclusive inclusion, so that a process, a method, an article, or a device that includes a list of elements not only includes those elements, but also includes other elements which are not expressly listed, or further includes elements inherent to this process, method, article, or device. Without further limitation, an element defined by the phrase "including a/an . . . " does not exclude the presence of another identical elements in the process, method, article or device that includes the element.

FIG. 1 is a schematic flowchart of an information processing method provided in an embodiment of the present disclosure. An execution subject of this method may be a device that can present a graphical user interface, such as a computer, a server, or a processor. A graphical user interface can be provided by a first terminal, where the graphical user interface displays at least a part of a game scene and at least one first virtual object located in the game scene. The method includes:

At step S101, determining, in response to a first touch operation on the graphical user interface, and a sliding operation on the graphical user interface, a sliding track of the sliding operation; and At step S102, selecting a first virtual object associated with the sliding track of the sliding operation as a target virtual object.

In the above, the first virtual object can be displayed in the game scene in a third-person manner, and the game scene may be a game scene of RTS (Real-Time Strategy) game. An RTS game may include two major camps. A camp controlled by a target player is usually called as our camp, and a camp controlled by another player is called as enemy camp. The first virtual object can be understood as a virtual object in our camp. It should be noted that the present disclosure does not limit the number of first virtual objects. In some embodiments, a first virtual object or group of first virtual objects may include a number of virtual objects of our camp.

In one or more embodiments of the present disclosure, the response to a first touch operation on the graphical user interface may include any one of the following touch operation scenes: a touch operation on a first control on the graphical user interface, a long-press operation on the game scene displayed on the graphical user interface, a re-press operation on the game scene displayed on the graphical user interface, or a double-click operation on the game scene displayed on the graphical user interface.

Herein, the touch operation on the first control on the graphical user interface is taken as an example for description. The first control is displayed on the graphical user interface that includes the game scene and at least one first virtual object. FIG. 2 is a schematic diagram of a display interface of the first control provided in an embodiment of the present disclosure. As shown in FIG. 2, the target player can perform the first touch operation on a first control 200 by a finger. After a first terminal held by the target player receives the first touch operation of the target player on the first control 200, the target player can perform a sliding operation on the graphical user interface, and the first terminal can make a response to the sliding operation. In the above, a specific form of the first control 200 may be a gesture icon, and also may be an icon in other forms, which is not limited in the present disclosure. It should be noted that manifestation of the virtual object as an individual is only for the sake of simplicity. In embodiments of the present disclosure, one virtual object also may be corps or army, i.e., each virtual object may be composed of a plurality of individuals.

In the above, the first touch operation may be single-click, double-click, long-press, re-press or other operations. In an example of the present disclosure, after double-clicking the first control 200 in FIG. 2, the target player can perform the sliding operation on the graphical user interface in FIG. 2 by dragging the first control 200 with a finger. In another example of the present disclosure, after the target player double-clicks the first control 200 in FIG. 2, the first control 200 does not move, and the target player directly performs the sliding operation on the graphical user interface in FIG. 2 with a finger.

After the target player performs the sliding operation, the first terminal can determine the sliding track corresponding to the sliding operation based on an area through which the finger of the target player passes on the graphical user interface. After the sliding track is determined, the first terminal can select a first virtual object associated with the sliding track as the target virtual object, i.e., select the target virtual object from at least one first virtual object in our camp. It should be noted that the present disclosure does not limit the number of target virtual objects.

In one or more embodiments of the present disclosure, after the target player releases the finger that performs the sliding operation on the graphical user interface, i.e., after the first terminal receives an instruction of stopping the sliding operation, the first virtual object associated with the sliding track formed by the sliding operation can be taken as the target virtual object, where the sliding track can be a track that forms a closed area or a track that forms a non-closed area, which is not limited in the present disclosure.

In conclusion, according to the information processing method provided in the embodiments of the present disclosure, after performing the first touch operation on the graphical user interface, the player can then perform the sliding operation on the graphical user interface, and the first terminal can take the first virtual object associated with the sliding track of the sliding operation as the target virtual object. That is to say, after touching the graphical user interface, the player can freely slide and select a desired first virtual object in the current game scene, which can improve the flexibility and efficiency of selecting a plurality of virtual objects.

In one or more embodiments of the present disclosure, the first touch operation and the sliding operation are continuous operations.

In an example of the present disclosure, as shown in FIG. 2, after the target player long-presses or re-presses the first control 200 (the first touch operation), the finger does not leave the graphical user interface, and then performs the sliding operation, i.e., the first touch operation and the sliding operation are continuous operations.

In another example of the present disclosure, after the target player performs double-click, long-press or re-press on the game scene displayed on the graphical user interface, the finger does not leave the game scene, and then performs the sliding operation, i.e., the first touch operation and the sliding operation are continuous operations.

In some examples, the first touch operation and the sliding operation may be discontinuous operations, for example, after the target player performs long-presses, re-presses, single-clicks or double-clicks on the first control 200, or performs double-click, long-press or re-press (i.e., the first touch operation) on the game scene displayed on the graphical user interface, the finger does not leave the graphical user interface, and then performs the sliding operation, i.e., after performing the first touch operation on the first control 200, the target player releases the finger, and then performs the sliding operation on the graphical user interface. It should be noted that the present disclosure does not limit the relationship between the first touch operation and the sliding operation.

In one or more embodiments of the present disclosure, after the above response to the sliding operation on the graphical user interface, the method further includes: displaying a graphical representation of the sliding track on the graphical user interface.

Description is made with reference to FIG. 3. FIG. 3 is a schematic diagram of a display interface of the sliding track provided in an embodiment of the present disclosure. It can be seen from FIG. 3 that a sliding track 300 can be displayed in the area where the finger of the target player slides, where a specific form of the sliding track 300 can be a line with an arrow, and a direction of the arrow can be used to indicate a direction in which the finger of the target player slides.

Further, the graphical representation of the sliding track can be displayed on the graphical user interface in a preset color state, for example, when the preset color state is red, the sliding track can be displayed on the graphical user interface by a red arrow line. It can be seen from FIG. 3 that a shape finally formed by the sliding track 300 is determined by the area through which the finger of the target player passes.

It can be seen that the first terminal can display, following the sliding operation of the target player on the graphical user interface, the sliding track in real time in the area where the finger of the target player slides, and in this way, the target player can more intuitively understand the first virtual object (the target virtual object) to be selected in real time during the sliding operation.

It can be understood that the camp controlled by the target player (i.e., our camp) includes at least one first virtual object, and in the present embodiment, the first virtual object associated with the sliding track can be selected as the target virtual object, where the first virtual object associated with the sliding track can be explained by the following embodiments.

In one or more embodiments of the present disclosure, selecting the first virtual object associated with the sliding track of the sliding operation as the target virtual object includes: selecting a first virtual object located in an area surrounded by the sliding track as the target virtual object.

In the above, first it is determined whether the sliding track forms a closed area, and if a closed area is formed, a first virtual object (or group of virtual objects) included in the closed area is taken as the target virtual object. As shown in FIG. 3, four first virtual objects are included in a closed area formed by the sliding track 300, and then the four first virtual objects can be used as target virtual objects, respectively. Definitely, a certain fault-tolerant space can be set for determining whether the sliding track forms a closed area, and the sliding track does not necessarily form a completely closed curve.

In one or more embodiments of the present disclosure, the first virtual object whose distance from the sliding track is less than a preset distance threshold is selected as the target virtual object. In an example, a first virtual object around the sliding track and meeting a preset condition can be taken as the target virtual object. In an example, the preset condition may be that a distance between the first virtual object and any point in the sliding track is less than the preset distance threshold, or a normal distance between the first virtual object and the sliding track is less than the preset distance threshold. Definitely, the preset condition can be set according to practical requirements, for example, a first virtual object passed by the sliding track can be taken as the target virtual object (equivalent to that the preset distance threshold is zero), which is not limited in the present disclosure.

In one or more embodiments of the present disclosure, the method further includes: displaying, after selecting the target virtual object, a selection mark in an area associated with an area displaying the target virtual object.

Figure 4:
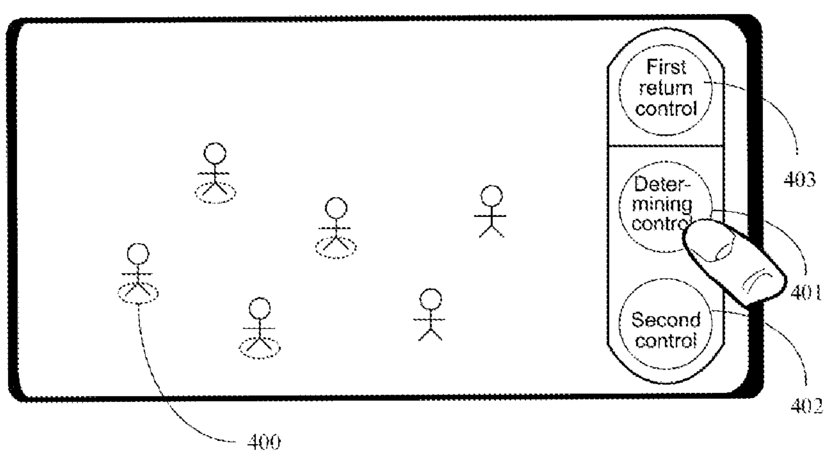
FIG. 4 is a schematic diagram of a display interface of selection mark provided in an embodiment of the present disclosure.

After the target virtual object is selected, i.e., after the target player releases the finger that performs the sliding operation on the graphical user interface, the selection mark can be displayed in an area associated with display of the target virtual object. Description is made with reference to FIG. 4. FIG. 4 is a schematic diagram of a display interface of a selection mark provided in an embodiment of the present disclosure. As shown in FIG. 4, after the sliding operation is stopped, a selection mark 400 can be respectively displayed on a foot area of each target virtual object, a dotted circle icon as shown in FIG. 4, where in an actual game scene, a specific form of the selection mark 400 may be a green light ring, and also can be in other forms (such as other shapes, other colors, or other indicators such as arrows hovering over the selected virtual objects), which is not limited in the present disclosure. For the above embodiment in which the first virtual object whose distance from the sliding track is less than the preset distance threshold is selected as the target virtual object, it is also possible that each first virtual object is immediately selected with the selection mark being displayed after meeting the selection, and the first virtual object can be selected and/or indicated as being selected before the sliding operation is stopped.

The player can observe the selected target virtual object more clearly from the camp through the selection mark, and intuitively know information about the number of respective target virtual objects and position information in the game scene.

Figure 5:
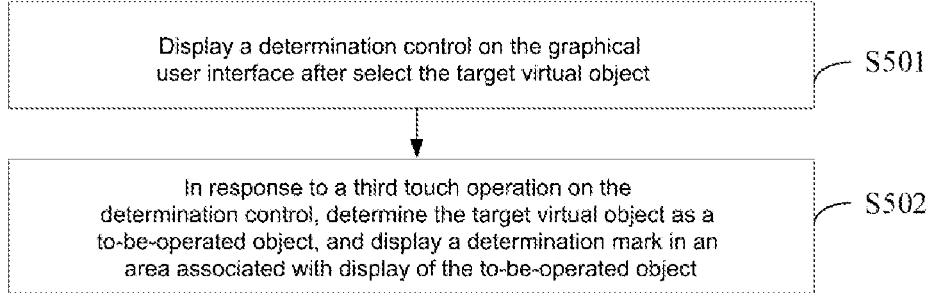
FIG. 5 is a schematic flowchart of another information processing method provided in an embodiment of the present disclosure.

FIG. 5 is a schematic flowchart of another information processing method provided in an embodiment of the present disclosure. As shown in FIG. 5, in one or more embodiments of the present disclosure, the method further may include:

At step S501, displaying a determination control on the graphical user interface after selecting the target virtual object.

In the above, timing for displaying the determination control on the graphical user interface may be described as in the following examples. After the target virtual object is selected, that is to say, after the sliding operation on the graphical user interface is stopped, i.e., after the target player releases the finger that performs the sliding operation on the graphical user interface, the determination control can be displayed on the graphical user interface, and such a determination control 401 is as shown in FIG. 4.

In another example, the determination control also can be displayed on the graphical user interface in response to stopping the first touch operation. After the target player performs the first touch operation on the first control 200 in FIG. 2, the first terminal can display the determination control on the graphical user interface based on the first touch operation.

Returning to FIG. 5 at step S502, in response to a third touch operation on the determination control, determining the target virtual object as a to-be-operated object, and displaying a determination mark in an area associated with display of the to-be-operated object.

Figure 6:
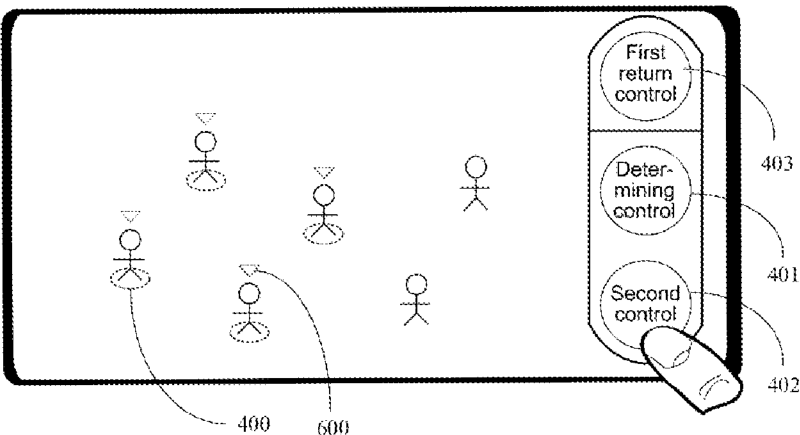
FIG. 6 is a schematic diagram of a display interface of determination mark provided in an embodiment of the present disclosure.

In the above, the target player can perform the third touch operation in the form of single-click, double-click, long-press or re-press on the determination control 401 in FIG. 4, where the first terminal can determine the target virtual object as the to-be-operated object based on the third touch operation, and can display the confirmation mark in an area associated with display of the to-be-operated object. Description is made with reference to FIG. 6. FIG. 6 is a schematic diagram of a display interface of a determination mark provided in an embodiment of the present disclosure. As shown in FIG. 6, a determination mark 600, which is a dotted triangle icon as shown in FIG. 6, can be displayed on an overhead area of each to-be-operated object, In the above, in an actual game scene, a specific form of the determination mark 600 can be a green arrow, and definitely also can be in other forms, which is not limited in the present disclosure.

Description is made with reference to FIG. 4 and FIG. 6. After the target player stops the sliding operation, the selection mark 400 as shown in FIG. 4 can be displayed in an area (for example, a foot area) associated with the area displaying the target virtual object. After the target player performs the third touch operation on the determination control 401 in FIG. 4, the target virtual object can be determined as the to-be-operated object, and the determination mark 600 as shown in FIG. 6 is displayed in an area associated with display of the to-be-operated object (such as the overhead area). It can be seen from FIG. 6 that both the selection mark 400 and the determination mark 600 are displayed in the area associated with display of the to-be-operated object. For another example, after the target player performs the third touch operation on the determination control 401 in FIG. 4, the selection mark 400 can be hidden, and only the determination mark 600 is displayed in the area associated with display of the to-be-operated object. It should be noted that the present disclosure does not limit the same. The purpose of the determination control is, on one hand, to enable the player to perform secondary confirmation on the target virtual object selected by the previous selection operation; and on the other hand, to enable the player to perform, on the premise of a function of cancelling the selection being provided, a deselecting operation on individual first virtual objects in the previously selected target virtual objects, and then determine, through the determination control, that the currently selected target virtual object is exactly the target virtual object which the player needs to select.

Figure 7:
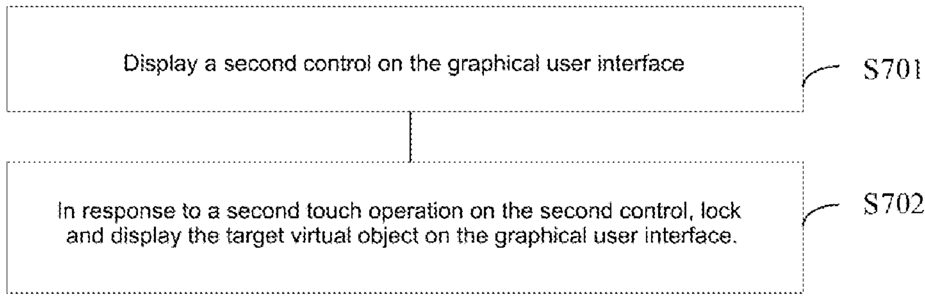
FIG. 7 is a schematic flowchart of still another information processing method provided in an embodiment of the present disclosure.

FIG. 7 is a schematic flowchart of still another information processing method provided in an embodiment of the present disclosure. As shown in FIG. 7, in one or more embodiments of the present disclosure, the method further may include:

At step S701, displaying a second control on the graphical user interface.

In the above, the second control can be understood as a control having a virtual lens locking function, and timing for displaying the second control on the graphical user interface can be described as in the following examples.

In one or more embodiments of the present disclosure, in response to a stopping operation, the second control is displayed on the graphical user interface, where the stopping operation may include: stopping the first touch operation or stopping the sliding operation on the graphical user interface.

In an example of the present disclosure, after the target player performs the first touch operation on the first control 200 in FIG. 2, the first terminal can display the second control on the graphical user interface based on the first touch operation. In another example of the present disclosure, as shown in FIG. 4, after the first terminal receives that the target player stops the sliding operation, i.e., after the target player releases the finger that performs the sliding operation on the graphical user interface, the second control 402 can be displayed on the graphical user interface, where a specific form of the second control 402 may be a camera icon, and certainly also can be icons in other forms, which is not limited in the present disclosure.

S702, locking and displaying the target virtual object on the graphical user interface in response to a second touch operation on the second control.

It should be noted that various controls (e.g., the determination control 401 and the second control 402) in FIG. 4 can still be displayed on the graphical user interface corresponding to FIG. 6.

In the above, the target player can perform the second touch operation in the form of single-click, double-click, long-press or double-press on the second control 402 in FIG. 4 or FIG. 6. The first terminal can automatically adjust, based on the second touch operation, parameters such as height and orientation of a virtual lens in the game scene according to the number of target virtual objects and a real-time position of each target virtual object in the game scene, and further lock and display the target virtual object on the graphical user interface. Description is made by taking the number of target virtual objects and the height of the virtual lens as dimensions, where when the number of target virtual objects is larger, the value of the height parameter of the virtual lens is larger.

In one or more embodiments of the present disclosure, locking and displaying the target virtual object on the graphical user interface includes: adjusting contents of the game scene displayed on the graphical user interface according to a position of the target virtual object in the game scene, so that the target virtual object is always located on the graphical user interface.

In an example, the target virtual object will move in the game scene, and the first terminal can automatically adjust the contents of the game scene displayed on the current interface of the first terminal according to position coordinates of the target virtual object in the game scene, i.e., with movement of the target virtual object in the game scene, the virtual lens associated with the game scene will always follow and focus on the target virtual object, making the target virtual object always on the graphical user interface.

Figure 8:
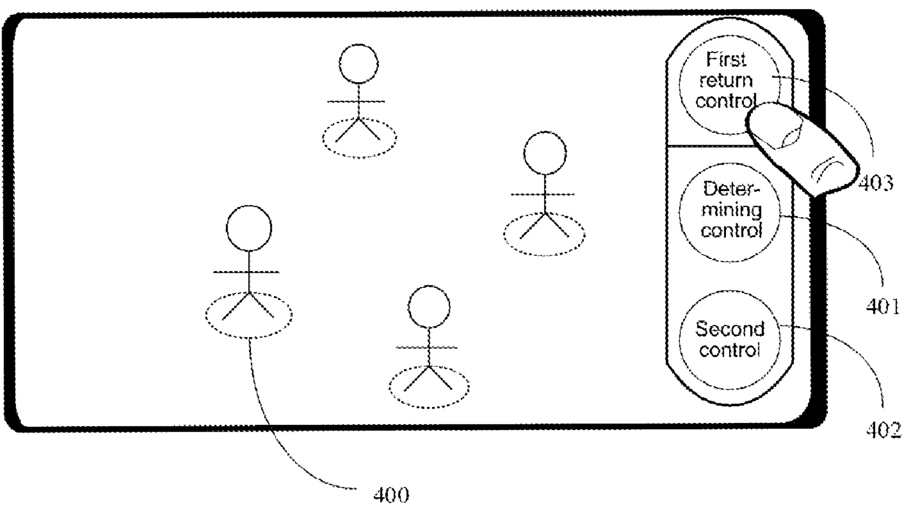
FIG. 8 is an interface schematic diagram of locking a target virtual object provided in an embodiment of the present disclosure.

FIG. 8 is an interface schematic diagram of locking the target virtual object provided in an embodiment of the present disclosure. Description is made with reference to FIG. 6. After the target player performs the second touch operation on the second control 402 in FIG. 6, the graphical user interface can display contents as shown in FIG. 8. It can be seen that, through the second touch operation of the player on the second control, the first terminal will automatically adjust relevant parameters of the virtual lens, and as the target virtual object moves in the game scene, the virtual lens will always follow and focus on the target virtual object. In this way, it can be avoided that the player manually selects a current perspective for viewing the game scene to pay attention to the target virtual object, so that the virtual lens can be controlled with high efficiency and high accuracy, and issues that could be caused by incorrect operation of graphical user interface by the player can be avoided.

Figure 9:
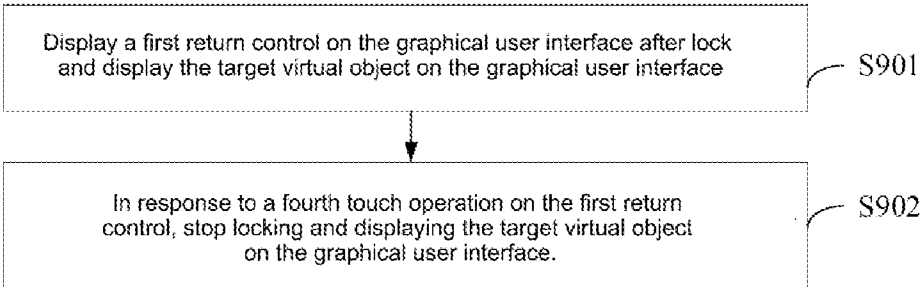
FIG. 9 is a schematic flowchart of a still further information processing method provided in an embodiment of the present disclosure.

FIG. 9 is a schematic flowchart of a still further information processing method provided in an embodiment of the present disclosure. As shown in FIG. 9, in one or more embodiments of the present disclosure, the method further may include:

At step S901, displaying a first return control on the graphical user interface after locking and displaying the target virtual object on the graphical user interface.

In the above, timing for displaying the first return control on the graphical user interface may be described as in the following examples. After the target virtual object is locked and displayed on the graphic user interface, i.e., after the target player performs the second touch operation on the second control 402 in FIG. 6, the first return control, such as a first return control 403 shown in FIG. 8, can be displayed on the graphic user interface. In the above, a specific form of the first return control 403 may be a return icon, and definitely also may be an icon in other forms, which is not limited in the present disclosure.

At step S902, in response to a fourth touch operation on the first return control, stopping locking and displaying the target virtual object on the graphical user interface.

The target player can perform the fourth touch operation in the form of single-click, double-click, long-press or double-press on the first return control 403 in FIG. 8, where based on the fourth touch operation, the first terminal can stop controlling the virtual lens to automatically track and focus on the target virtual object, i.e., stop locking and displaying the target virtual object on the graphical user interface.

In one or more embodiments of the present disclosure, the first terminal can restore the target virtual object in FIG. 8 to a state of the target virtual object in FIG. 2 based on the fourth touch operation. Definitely, a game scene in which the restored target virtual object is located is a game scene in which the target virtual object is located when the target player performs the fourth touch operation on the first return control 403, but the target virtual object is no longer locked and displayed on the graphical user interface, and with the operation of the player and the change of the game scene, the target virtual object will not be always displayed on the graphical user interface.

It can be seen that the player can flexibly switch the virtual object to be concerned directly through the touch operation on the first return control, which can improve the experience of the player.

In one or more embodiments of the present disclosure, the method further can include: displaying a second return control on the graphical user interface after selecting the target virtual object; and canceling the selection of the target virtual object and canceling the display of the selection mark in response to a fifth touch operation on the second return control.

Based on the fifth touch operation, the first terminal can release the target virtual object as an ordinary first virtual object, i.e., cancel the selected target virtual object, meanwhile can cancel the selection mark 400 displayed in an area associated with the area of the target player in FIG. 4, i.e., a dotted circular icon in FIG. 4, and restore the target virtual object in FIG. 4 to the state of the virtual object (ordinary first virtual object) in FIG. 2.

It can be seen that the player can flexibly switch a selection state of the target virtual object directly through the touch operation on the second return control, which can improve the experience of the player.

In one or more embodiments of the present disclosure, the method further can include: displaying a third return control on the graphical user interface after determining the target virtual object as the to-be-operated object; and canceling the determination of the target virtual object as the to-beoperated object and canceling the display of the determination mark in response to a sixth touch operation on the third return control.

The first terminal can cancel, based on the sixth touch operation, the target virtual object being as the to-be-operated object, and meanwhile, can cancel the mark displayed in an area associated with the area of the to-be-operated object in FIG. 6, for example, cancel the display of the determination mark 600, i.e., display of a dotted triangle icon in FIG. 6.

It can be seen that the player can improve the flexibility for the player to select the to-be-operated object directly through the touch operation on the third return control.

In one or more embodiments of the present disclosure, the third return control and the second return control can be the same return control, i.e., a touch operation performed on the return control can simultaneously cancel the selection state and the determination state of the target virtual object and cancel the display of the selection mark and the determination mark. The third return control or the second return control also can be the same return control as the first return control, and after the return control is clicked, in addition to canceling the selection state or the determination state (including canceling the display of the selection mark or the determination mark) of the target virtual object, locking and display of the target virtual object also can be cancelled. A person skilled in the art also can combine two or three of the above functions of the return controls in other forms as required.

It should be noted that the relationship between the first return control 403 in FIG. 4 and the first control 200 in FIG. 2 can be as follows. After receiving that the target player stops the sliding operation, the first terminal can convert the first control 200 in FIG. 2 into the first return control 403 in FIG. 4. In another sense, it can also be regarded as displaying the first return control 403 in the area of the original first control 200.

Figure 10:
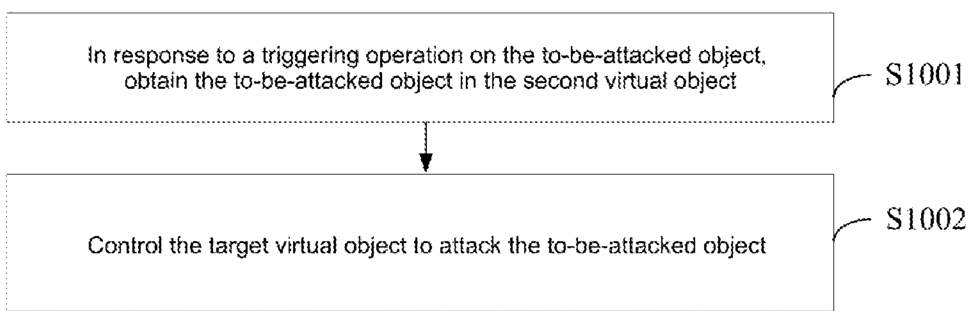
FIG. 10 is a schematic flowchart of still another information processing method provided in an embodiment of the present disclosure.

FIG. 10 is a schematic flowchart of still another information processing method provided in an embodiment of the present disclosure. At least one second virtual object located in the game scene is further displayed on the graphical user interface, and the first virtual object and the second virtual object are two opposing sides fighting in a same game, i.e., the second virtual object is a virtual object in an enemy camp. As shown in FIG. 10, in one or more embodiments of the present disclosure, the method further may include:

At step S1001, obtaining a to-be-attacked object in the second virtual object(s) in response to a triggering operation on the to-be-attacked object; and At step S1002, controlling the target virtual object to attack the to-be-attacked object.

In the above, the target player can select the to-be-attacked object from the enemy camp according to practical requirements. In an example of the present disclosure, the target player can select the second virtual object as the to-be-attacked object by performing a click operation on the second virtual object in the enemy camp. In another example of the present disclosure, the target player can select the second virtual object as the to-be-attacked object by performing a box selection operation on the second virtual object in the enemy camp. Definitely, the to-be-attacked object also can be selected by a triggering operation in other manners, which is not limited in the present disclosure.

After the to-be-attacked object is determined, the target virtual object(s) on the graphical user interface can attack the to-be-attacked object simultaneously. Description is made with reference to FIG. 8. Four target virtual objects in FIG. 8 can attack the to-be-attacked object simultaneously, that is to say, the target player can uniformly send an attacking instruction to the selected target virtual objects.

In one or more embodiments of the present disclosure, controlling the target virtual object to attack the to-be-attacked object includes: in response to a triggering operation on a target attacking manner, controlling the target virtual object to attack the to-be-attacked virtual object in the target attacking manner.

In the above, when the target virtual objects attack the to-be-attacked object simultaneously, the target player can select the target attacking manner to attack the to-be-attacked object according to practical requirements. In an example of the present disclosure, the graphical user interface includes thereon at least one attacking weapon selection control, where after the target player performs a triggering operation on one of the attacking weapon selection control (s), a target attacking weapon can be determined, and the target virtual object can attack the to-be-attacked object by using an attacking manner of this target attacking weapon. Description is made with reference to FIG. 8. The four target virtual objects in FIG. 8 can attack the to-be-attacked object by using the target attacking weapons, respectively.

In one or more embodiments of the present disclosure, the method further includes: responding to a triggering operation for determining a target location in the game scene; and controlling the target virtual object to move to the target location.

The target player can select the target location in the game scene according to practical requirements. A selection method can be clicking with a finger. After the target location is determined, the target virtual object(s) on the graphical user interface can move towards the target location simultaneously. Description is made with reference to FIG. 8. The four target virtual objects in FIG. 8 can move towards the target location simultaneously, that is to say, the target player can uniformly send a moving instruction to the selected target virtual objects.

It can be seen that, after the target objects are determined, a command, such as attacking and moving, can be uniformly issued to the target objects, which can improve the operation efficiency.

Figure 11:
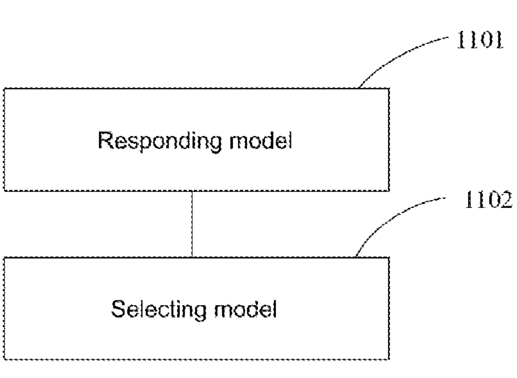
FIG. 11 shows an information processing device provided in an embodiment of the present disclosure.

FIG. 11 is an information processing device provided in an embodiment of the present disclosure. A graphical user interface is provided by a first terminal. The graphical user interface at least displays a part of a game scene and at least one first virtual object located in the game scene. The device includes:

a responding module 1101, configured to determine, in response to a first touch operation on the graphical user interface and a sliding operation on the graphical user interface, a sliding track of the sliding operation; and a selecting module 1102, configured to select a first virtual object associated with the sliding track of the sliding operation as a target virtual object.

In one or more embodiments of the present disclosure, the first touch operation and the sliding operation are continuous operations.

In one or more embodiments of the present disclosure, the device further includes: a displaying device.

The displaying device is configured to display the sliding track on the graphical user interface.

In one or more embodiments of the present disclosure, the first touch operation includes at least one of:

- a touch operation on a first control on the graphical user interface;

a long-press operation on the game scene displayed on the graphical user interface;

a re-press operation on the game scene displayed on the graphical user interface; or a double-click operation on the game scene displayed on the graphical user interface.

In one or more embodiments of the present disclosure, the selecting module 1102 is further configured to select a first virtual object located in an area surrounded by the sliding track as the target virtual object.

In one or more embodiments of the present disclosure, the selecting module 1102 is further configured to select a first virtual object whose distance from the sliding track is less than a preset distance threshold as the target virtual object.

In one or more embodiments of the present disclosure, the displaying module is further configured to display a second control on the graphical user interface; and lock and display, in response to the second touch operation on the second control, the target virtual object on the graphical user interface.

In one or more embodiments of the present disclosure, the displaying module is further configured to adjust contents of the game scene displayed on the graphical user interface according to a position of the target virtual object in the game scene, so that the target virtual object is always located on the graphical user interface.

In one or more embodiments of the present disclosure, the displaying module is further configured to display a second control on the graphical user interface in response to a stopping operation.

In one or more embodiments of the present disclosure, the stopping operation includes: stopping the first touch operation or stopping the sliding operation on the graphical user interface.

In one or more embodiments of the present disclosure, the displaying module is further configured to display, after selecting the target virtual object, a selection mark in an area associated with an area displaying the target virtual object.

In one or more embodiments of the present disclosure, the displaying module is further configured to display a determination control on the graphical user interface after selecting the target virtual object; and in response to a third touch operation on the determination control, determine the target virtual object as a to-be-operated object, and display a determination mark in an area associated with display of the to-be-operated object.

In one or more embodiments of the present disclosure, the displaying module is further configured to display a first return control on the graphical user interface after locking and displaying the target virtual object on the graphical user interface; and stop locking and displaying the target virtual object on the graphical user interface in response to a fourth touch operation on the first return control.

In one or more embodiments of the present disclosure, the displaying module is further configured to display a second return control on the graphical user interface after selecting the target virtual object; and cancel the selection of the target virtual object and cancel the display of the selection mark in response to a fifth touch operation on the second return control.

In one or more embodiments of the present disclosure, the displaying module is further configured to display a third return control on the graphical user interface after determining the target virtual object as the to-be-operated object; and cancel the determination of the target virtual object as the to-be-operated object and cancel the display of the determination mark in response to a sixth touch operation on the third return control.

In one or more embodiments of the present disclosure, at least one second virtual object located in the game scene is further displayed on the graphical user interface, and the first virtual object and the second virtual object are two opposing sides fighting in a same game.

Correspondingly, the device further includes: a controlling module.

The controlling module is further configured to obtain a to-be-attacked object in the second virtual object(s) in response to a triggering operation on the to-be-attacked object; and control the target virtual object to attack the to-be-attacked object.

In one or more embodiments of the present disclosure, the controlling module is further configured to control, in response to a triggering operation on a target attacking manner, the target virtual object to attack the to-be-attacked object in the target attacking manner.

In one or more embodiments of the present disclosure, the controlling module is further configured to respond to a triggering operation for determining a target location in the game scene; and control the target virtual object to move to the target location.

The above device is configured to execute the method provided in the foregoing embodiments and has similar implementation principle and technical effects. For the information processing device provided in the embodiments of the present disclosure, the graphical user interface is provided by the first terminal, where the graphical user interface displays at least a part of a game scene and at least one first virtual object located in the game scene, and the device includes the modules for executing the following steps: determining, in response to the first touch operation on the graphical user interface and the sliding operation on the graphical user interface, the sliding track of the sliding operation; and selecting the first virtual object associated with the sliding track of the sliding operation as the target virtual object. That is to say, after the player touches the graphical user interface, the player can freely slide and select a desired first virtual object in the current game scene, which can improve the flexibility and efficiency of selecting a plurality of virtual objects.

The above modules may be one or more integrated circuits configured to implement the above method, for example, one or more Application Specific Integrated Circuits (ASIC for short), one or more Digital Signal Processors (DSP for short), or one or more Field Programmable Gate Arrays (FPGA for short), etc. For another example, when a certain module above is implemented in a form of processing element scheduler code, the processing element may be a general purpose processor, for example, a Central Processing Unit (CPU for short) or other processors that can call the program code. For another example, these modules may be integrated together and implemented in the form of a system-on-a-chip (SOC for short).

Figure 12:
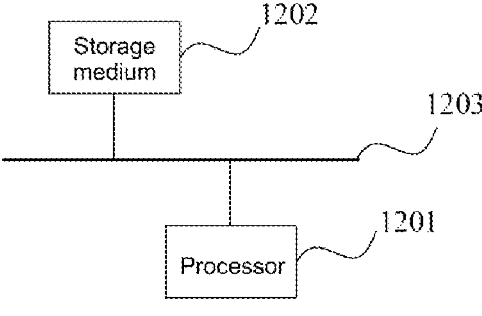
FIG. 12 is a structural schematic diagram of electronic equipment provided in an embodiment of the present disclosure.

FIG. 12 is a structural schematic diagram of electronic equipment provided in an embodiment of the present disclosure. As shown in FIG. 12, the electronic equipment may include: a processor 1201, a storage medium 1202, and a bus 1203, where the storage medium 1202 stores machine-readable instructions executable by the processor 1201, where when the electronic equipment is running, the processor 1201 is in communication with the storage medium 1202 via the bus 1203, and the processor 1201 executes the machine-readable instructions so as to execute the method including the following steps:

in response to a first touch operation on a graphical user interface, determining, for a sliding operation on the graphical user interface, a sliding track of the sliding operation; and selecting a first virtual object associated with the sliding track of the sliding operation as a target virtual object.

In one or more embodiments of the present disclosure, the first touch operation and the sliding operation are continuous operations.

In one or more embodiments of the present disclosure, after the response to the sliding operation on the graphical user interface, the method further includes: displaying the sliding track on the graphical user interface.

In one or more embodiments of the present disclosure, the first touch operation includes at least one of:

a touch operation on a first control on the graphical user interface;

a long-press operation on the game scene displayed on the graphical user interface;

a re-press operation on the game scene displayed on the graphical user interface; or a double-click operation on the game scene displayed on the graphical user interface.

In one or more embodiments of the present disclosure, selecting the first virtual object associated with the sliding track of the sliding operation as the target virtual object includes:

selecting a first virtual object located in an area surrounded by the sliding track as the target virtual object.

In one or more embodiments of the present disclosure, selecting the first virtual object associated with the sliding track of the sliding operation as the target virtual object includes:

selecting a first virtual object whose distance from the sliding track is less than a preset distance threshold as the target virtual object.

In one or more embodiments of the present disclosure, the method further includes:

displaying a second control on the graphical user interface; and locking and displaying the target virtual object on the graphical user interface in response to a second touch operation on the second control.

In one or more embodiments of the present disclosure, locking and displaying the target virtual object on the graphical user interface includes:

adjusting contents of the game scene displayed on the graphical user interface according to a position of the target virtual object in the game scene, so that the target virtual object is always located on the graphical user interface.

In one or more embodiments of the present disclosure, displaying the second control on the graphical user interface includes:

displaying the second control on the graphical user interface in response to a stopping operation.

In one or more embodiments of the present disclosure, the stopping operation includes: stopping the first touch operation or stopping the sliding operation on the graphical user interface.

In one or more embodiments of the present disclosure, the method further includes:

displaying, after selecting the target virtual object, a selection mark in an area associated with display of the target virtual object.

In one or more embodiments of the present disclosure, the method further includes:

displaying a determination control on the graphical user interface after selecting the target virtual object; and in response to a third touch operation on the determination control, determining the target virtual object as a to-be-operated object, and displaying a determination mark in an area associated with display of the to-be-operated object.

In one or more embodiments of the present disclosure, the method further includes:

displaying a first return control on the graphical user interface after locking and displaying the target virtual object on the graphical user interface; and in response to a fourth touch operation on the first return control, stopping locking and displaying the target virtual object on the graphical user interface.

In one or more embodiments of the present disclosure, the method further includes:

displaying a second return control on the graphical user interface after selecting the target virtual object; and canceling the selection of the target virtual object and canceling the display of the selection mark in response to a fifth touch operation on the second return control.

In one or more embodiments of the present disclosure, the method further includes:

displaying a third return control on the graphical user interface after determining the target virtual object as the to-be-operated object; and canceling the determination of the target virtual object as the to-be-operated object and canceling the display of the determination mark in response to a sixth touch operation on the third return control.

In one or more embodiments of the present disclosure, at least one second virtual object located in the game scene is further displayed on the graphical user interface, and the first virtual object and the second virtual object are two opposing sides fighting in a same game.

The method further includes:

obtaining a to-be-attacked object in the second virtual object(s), in response to a triggering operation on the to-be-attacked object; and controlling the target virtual object to attack the to-be-attacked object.

In one or more embodiments of the present disclosure, controlling the target virtual object to attack the to-be-attacked object includes:

in response to a triggering operation on a target attacking manner, controlling the target virtual object to attack the to-be-attacked object in the target attacking manner.

In one or more embodiments of the present disclosure, the method further includes:

responding to a triggering operation for determining a target location in the game scene, and controlling the target virtual object to move to the target location.

The electronic equipment provided in the embodiments of the present disclosure can determine, in response to the first touch operation on the graphical user interface and the sliding operation on the graphical user interface, the sliding track of the sliding operation; and select the first virtual object associated with the sliding track of the sliding operation as the target virtual object. That is to say, after the player touches the graphical user interface, the player can freely slide and select a desired first virtual object in the current game scene, which can improve the flexibility and efficiency of selecting a plurality of virtual objects.

In one or more embodiments of the present disclosure, the present disclosure further provides a storage medium, where a computer program is stored on the storage medium, and the computer program, when run by a processor, executes the method including the following steps:

- determining, in response to a first touch operation on the graphical user interface and a sliding operation on the graphical user interface, a sliding track of the sliding operation; and
- selecting a first virtual object associated with the sliding track of the sliding operation as a target virtual object.

In one or more embodiments of the present disclosure, the first touch operation and the sliding operation are continuous operations.

In one or more embodiments of the present disclosure, after the response to the sliding operation on the graphical user interface, the method further includes:

- displaying the sliding track on the graphical user interface.

In one or more embodiments of the present disclosure, the first touch operation includes at least one of:

- a touch operation on a first control on the graphical user interface;
- a long-press operation on the game scene displayed on the graphical user interface;
- a re-press operation on the game scene displayed on the graphical user interface; or
- a double-click operation on the game scene displayed on the graphical user interface.

In one or more embodiments of the present disclosure, selecting the first virtual object associated with the sliding track of the sliding operation as the target virtual object includes:

- selecting a first virtual object located in an area surrounded by the sliding track as the target virtual object.

In one or more embodiments of the present disclosure, selecting the first virtual object associated with the sliding track of the sliding operation as the target virtual object includes:

- selecting a first virtual object whose distance from the sliding track is less than a preset distance threshold as the target virtual object.

In one or more embodiments of the present disclosure, the method further includes:

- displaying a second control on the graphical user interface; and
- locking and displaying the target virtual object on the graphical user interface in response to a second touch operation on the second control.

In one or more embodiments of the present disclosure, locking and displaying the target virtual object on the graphical user interface includes:

- adjusting contents of the game scene displayed on the graphical user interface according to a position of the target virtual object in the game scene, so that the target virtual object is always located on the graphical user interface.

In one or more embodiments of the present disclosure, displaying the second control on the graphical user interface includes:

displaying the second control on the graphical user interface in response to a stopping operation.

In one or more embodiments of the present disclosure, the stopping operation includes: stopping the first touch operation or stopping the sliding operation on the graphical user interface.

In one or more embodiments of the present disclosure, the method further includes:

- displaying, after selecting the target virtual object, a selection mark in an area associated with display of the target virtual object.

In one or more embodiments of the present disclosure, the method further includes:

- displaying a determination control on the graphical user interface after selecting the target virtual object; and
- determining the target virtual object as a to-be-operated object in response to a third touch operation on the determination control and displaying a determination mark in an area associated with display of the to-be-operated object.

In one or more embodiments of the present disclosure, the method further includes:

- displaying a first return control on the graphical user interface after locking and displaying the target virtual object on the graphical user interface; and
- in response to a fourth touch operation on the first return control, stopping locking and displaying the target virtual object on the graphical user interface.

In one or more embodiments of the present disclosure, the method further includes:

- displaying a second return control on the graphical user interface after selecting the target virtual object; and
- canceling the selection of the target virtual object and canceling the display of the selection mark in response to a fifth touch operation on the second return control.

In one or more embodiments of the present disclosure, the method further includes:

- displaying a third return control on the graphical user interface after determining the target virtual object as the to-be-operated object; and
- canceling the determination of the target virtual object as the to-be-operated object and canceling the display of the determination mark in response to a sixth touch operation on the third return control.

In one or more embodiments of the present disclosure, at least one second virtual object located in the game scene is further displayed on the graphical user interface, and the first virtual object and the second virtual object are two opposing sides fighting in a same game.

The method further includes:

- obtaining a to-be-attacked object in the second virtual object(s) in response to a triggering operation on the to-be-attacked object; and
- controlling the target virtual object to attack the to-be-attacked object.

In one or more embodiments of the present disclosure, controlling the target virtual object to attack the to-be-attacked object includes:

- controlling, in response to a triggering operation on a target attacking manner, the target virtual object to attack the to-be-attacked object in the target attacking manner.

In one or more embodiments of the present disclosure, the method further includes:

- responding to a triggering operation for determining a target location in the game scene, and
- controlling the target virtual object to move to the target location.

The storage medium provided in the embodiments of the present disclosure can determine, in response to the first touch operation on the graphical user interface and the sliding operation on the graphical user interface, the sliding track of the sliding operation; and select the first virtual object associated with the sliding track of the sliding operation as the target virtual object. That is to say, after the player touches the graphical user interface, the player can freely slide and select a desired first virtual object in the current game scene, which can improve the flexibility and efficiency of selecting a plurality of virtual objects.

In the several embodiments provided in the present disclosure, it should be understood that the device and the method disclosed may be implemented in other manners. For example, the device embodiments described in the above are merely exemplary, for example, units are merely divided according to logical functions, but they may be divided in other manners in practical implementation, for example, multiple units or components may be combined or may be integrated into another system, or some features may be omitted, or not executed. In addition, the mutual coupling, direct coupling or communication connection shown or discussed may be implemented via indirect coupling or communication connection through some interfaces, devices or units, and they may be in electrical, mechanical, or other forms.

The units described as separate parts may be or also may not be physically separated. The parts displayed as units may be or also may not be physical units, i.e., they may be located at one place, or also may be distributed on a plurality of network units. Some or all of the units may be selected according to actual needs to achieve the objectives of the embodiments.

Besides, various functional units in various embodiments of the present disclosure can be integrated into one processing unit or exist in a physically independent way, or two or more units also may be integrated into one unit. The above integrated unit may be implemented in the form of hardware, or in the form of hardware plus a software functional unit.

The above integrated unit implemented in a form of software functional unit may be stored in one computer-readable storage medium. The above software functional unit is stored in one storage medium, including several instructions to make one piece of computer equipment (which can be a personal computer, a server or a network device etc.) or a processor execute some of the steps of the methods of various embodiments of the present disclosure. The aforementioned storage medium can include any or a combination of a U disk, mobile hard disk, Read-Only Memory (ROM for short), Random Access Memory (RAM for short), magnetic disk or optical disk and various media that can store program codes.

The beneficial effects of the present disclosure are as follows: for the information processing method, electronic equipment, and non-transitory storage medium provided in the embodiments of the present disclosure, the graphical user interface is provided by the first terminal, where the graphical user interface displays at least a part of the game scene, and at least one first virtual object located in the game scene. The method includes: responding to the first touch operation on the graphical user interface and the sliding operation on the graphical user interface, and determining the sliding track of the sliding operation; and selecting the first virtual object associated with the sliding track of the sliding operation as the target virtual object. That is to say, after the player touches the graphical user interface, the player can freely slide and select a desired first virtual object in the current game scene, which can improve the flexibility and efficiency of selecting a plurality of virtual objects.

It should be indicated that in the present text, relational terms such as first and second are merely for distinguishing one entity or operation from another entity or operation, while it is not required or implied that these entities or operations necessarily have any such practical relation or order. Moreover, terms "including", "containing" or any other variations thereof are intended to be non-exclusive, thus a process, method, article or device including a series of elements not only include those elements, but also include other elements that are not listed definitely, or further include elements inherent to such process, method, article or device. Without more restrictions, an element defined with wording "including a . . . " does not exclude presence of other same elements in the process, method, article or device including said element.

The above descriptions are only preferred embodiments of the present disclosure and are not intended to limit the present disclosure. For a person skilled in the art, the present disclosure may have various modifications and changes. Any modifications, equivalent substitutions, improvements and the like made within the spirit and principle of the present disclosure should be covered within the scope of protection of the present disclosure. It should be noted that similar reference signs and letters represent similar items in the following drawings, therefore, once a certain item is defined in one drawing, it is not needed to be defined or explained in subsequent drawings. The above descriptions are only preferred embodiments of the present disclosure and are not intended to limit the present disclosure. For a person skilled in the art, the present disclosure may have various modifications and changes. Any modifications, equivalent substitutions, improvements and the like made within the spirit and principle of the present disclosure should be covered within the scope of protection of the present disclosure.

What is claimed is:

1. An information processing method, comprising:

responding, by a terminal, to a first touch operation on a graphical user interface and a sliding operation on the graphical user interface, and determining a sliding track of the sliding operation, wherein the graphical user interface is provided by the terminal, and the graphical user interface displays at least a part of a game scene and at least one first virtual object located in the game scene; and selecting a first virtual object associated with the sliding track of the sliding operation as a target virtual object, wherein the method further comprises:

displaying a virtual lens locking control on the graphical user interface;

in response to a second touch operation on the virtual lens locking control, locking and displaying the target virtual object on the graphical user interface;

displaying a first return control on the graphical user interface after locking and displaying the target virtual object on the graphical user interface; and in response to a touch operation on the first return control, stopping locking and displaying the target virtual object on the graphical user interface.

2. The method according to claim 1, wherein the first touch operation and the sliding operation are continuous operations.

3. The method according to claim 1, further comprising:

displaying the sliding track on the graphical user interface.

4. The method according to claim 1, wherein the first touch operation comprises at least one of following operations:

a touch operation on a first control on the graphical user interface;

a long-press operation on the game scene displayed on the graphical user interface;

a re-press operation on the game scene displayed on the graphical user interface; or a double-click operation on the game scene displayed on the graphical user interface.

5. The method according to claim 1, wherein selecting the first virtual object associated with the sliding track of the sliding operation as the target virtual object comprises:

selecting the first virtual object located in an area surrounded by the sliding track as the target virtual object.

6. The method according to claim 1, wherein selecting the first virtual object associated with the sliding track of the sliding operation as the target virtual object comprises:

selecting the first virtual object whose distance from the sliding track is less than a preset distance threshold as the target virtual object.

7. The method according to claim 1, wherein locking and displaying the target virtual object on the graphical user interface comprises:

adjusting contents of the game scene displayed on the graphical user interface according to a position of the target virtual object in the game scene, so that the target virtual object is always located on the graphical user interface.

8. The method according to claim 1, wherein displaying the virtual lens locking control on the graphical user interface comprises:

in response to a stopping operation, displaying the virtual lens locking control on the graphical user interface.

9. The method according to claim 8, wherein the stopping operation comprises: stopping the first touch operation, or stopping the sliding operation on the graphical user interface.

10. The method according to claim 1, wherein the method further comprises:

displaying a selection mark in an area associated with display of the target virtual object after selecting the target virtual object.

11. The method according to claim 1, wherein the method further comprises:

displaying a determination control on the graphical user interface after selecting the target virtual object; and in response to a third touch operation on the determination control, determining the target virtual object as a to-be-operated object, and displaying a determination mark in an area associated with display of the to-be-operated object.

12. The method according to claim 10, wherein the method further comprises:

displaying a second return control on the graphical user interface after selecting the target virtual object; and in response to a fifth touch operation on the second return control, canceling selection of the target virtual object and canceling display of the selection mark.

13. The method according to claim 11, wherein the method further comprises:

displaying a third return control on the graphical user interface after determining the target virtual object as the to-be-operated object; and in response to a sixth touch operation on the third return control, canceling determination of the target virtual object as the to-be-operated object and canceling display of the determination mark.

14. The method according to claim 1, wherein at least a second virtual object located in the game scene is further displayed on the graphical user interface, the second virtual object being an opposing side to the first virtual object in a same game; and the method further comprises:

in response to a triggering operation on a to-be-attacked object, obtaining the to-be-attacked object in the second virtual object; and controlling the target virtual object to attack the to-be-attacked object.

15. The method according to claim 14, wherein controlling the target virtual object to attack the to-be-attacked object comprises:

in response to a triggering operation on a target attacking manner, controlling the target virtual object to attack the to-be-attacked object in the target attacking manner.

16. The method according to claim 1, wherein the method further comprises:

responding to a triggering operation for determining a target location in the game scene; and controlling the target virtual object to move to the target location.

17. An electronic equipment, comprising: a processor, a storage medium, and a bus, wherein the storage medium stores machine-readable instructions executable by the processor, wherein when the electronic equipment is running, the processor is in communication with the storage medium via the bus, and the processor executes the machine-readable instructions so as to execute steps of an information processing method, with the method comprising:

responding to a first touch operation on a graphical user interface and a sliding operation on the graphical user interface, and determining a sliding track of the sliding operation, wherein the graphical user interface is provided by the electronic equipment, and the graphical user interface displays at least a part of a game scene and at least one first virtual object located in the game scene; and selecting a first virtual object associated with the sliding track of the sliding operation as a target virtual object, wherein the method further comprises:

displaying a virtual lens locking control on the graphical user interface;

in response to a second touch operation on the virtual lens locking control, locking and displaying the target virtual object on the graphical user interface;

displaying a first return control on the graphical user interface after locking and displaying the target virtual object on the graphical user interface; and in response to a touch operation on the first return control, stopping locking and displaying the target virtual object on the graphical user interface.

18. A non-transitory storage medium, storing a computer program, wherein the computer program, when executed by a processor, executes steps of an information processing method, with the method comprising:

responding to a first touch operation on a graphical user interface and a sliding operation on the graphical user interface, and determining a sliding track of the sliding operation, wherein the graphical user interface is provided by an electronic equipment, and the graphical user interface displays at least a part of a game scene and at least one first virtual object located in the game scene; and selecting a first virtual object associated with the sliding track of the sliding operation as a target virtual object, wherein the method further comprises:

displaying a virtual lens locking control on the graphical user interface;

in response to a second touch operation on the virtual lens locking control, locking and displaying the target virtual object on the graphical user interface;

displaying a first return control on the graphical user interface after locking and displaying the target virtual object on the graphical user interface; and in response to a touch operation on the first return control, stopping locking and displaying the target virtual object on the graphical user interface.

* * * * *